US005286046A

United States Patent [19]

Bottemiller et al.

[11] Patent Number: 5,286,046
[45] Date of Patent: Feb. 15, 1994

[54] GERIATRIC CHAIR

[75] Inventors: Donald L. Bottemiller; Arthur A. Apissomian, both of Wadena, Minn.

[73] Assignee: Homecrest Industries Incorporated, Wadena, Minn.

[21] Appl. No.: 797,784

[22] Filed: Nov. 25, 1991

[51] Int. Cl.[5] ........ B62B 7/04

[52] U.S. Cl. ........ 280/47.38; 5/653; 188/2 F; 280/304.1; 297/423.18; 297/423.38; 297/DIG. 4

[58] Field of Search ........ 280/47.38, 250.1, 304.1; 297/DIG. 4, 310, 428, 437; D6/596; 5/653; 188/2 F, 29

[56] References Cited

U.S. PATENT DOCUMENTS

| | | | |
|---|---|---|---|
| 1,534,796 | 4/1925 | McCollough | 297/270 |
| 1,698,344 | 1/1929 | Mott | 297/339 |
| 1,834,345 | 12/1931 | Nelson | 297/270 |
| 1,917,557 | 7/1933 | Steiger | 280/647 |
| 2,053,852 | 9/1936 | Tracy | 155/30 |
| 2,065,233 | 12/1936 | Mallett | 155/30 |
| 2,280,732 | 4/1942 | Thum | 297/310 |
| 2,354,845 | 8/1944 | Thornton | 280/61 |
| 2,427,161 | 9/1947 | Roe | 188/2 F |
| 2,487,880 | 11/1949 | Kissell | 155/106 |
| 2,550,593 | 4/1951 | Perry | 155/1 |
| 2,722,967 | 11/1955 | Reinholz | 155/69 |
| 2,751,027 | 6/1956 | McLaughlin | 180/9.1 |
| 2,765,480 | 10/1956 | Mueller | 5/653 |
| 2,869,623 | 1/1959 | Poulin | 155/198 |
| 2,939,454 | 6/1960 | Lichtenstein et al. | 5/653 |
| 2,986,200 | 5/1961 | Nobile | 155/30 |
| 3,091,426 | 5/1963 | Bogart | 248/395 |
| 3,117,653 | 1/1964 | Altherr | 188/29 |
| 3,137,511 | 6/1964 | Weil et al. | 280/5.24 |
| 3,138,402 | 6/1964 | Heyl, Jr. et al. | 297/69 |
| 3,139,306 | 6/1964 | Jennings et al. | 297/DIG. 4 |
| 3,147,038 | 9/1964 | Barabas | 297/89 |
| 3,158,398 | 11/1964 | Stryker | 297/333 |
| 3,218,102 | 11/1965 | Specketer | 297/330 |
| 3,250,569 | 5/1966 | Gaffney | 297/330 |
| 3,261,031 | 7/1966 | Gates | 5/86 |
| 3,343,871 | 9/1967 | Yates et al. | 297/323 |
| 3,379,450 | 4/1968 | Jones et al. | 280/36 |
| 3,406,772 | 10/1968 | Ahrent et al. | 180/9.24 |
| 3,479,087 | 11/1999 | Burke | 297/339 |
| 3,532,353 | 10/1970 | Rogol | 280/36 |
| 3,596,991 | 8/1971 | Mckee | 297/326 |
| 3,623,767 | 11/1971 | Condon | 297/330 |
| 3,712,671 | 1/1973 | Dalton et al. | 297/258 |
| 3,787,089 | 1/1974 | Wrethander | 297/118 |
| 3,807,795 | 4/1974 | Weant et al. | 297/330 |
| 3,848,845 | 11/1974 | Bogart | 248/393 |
| 3,865,050 | 2/1975 | Cecchetti | 108/19 |
| 3,964,786 | 6/1976 | Mashuda | 297/330 |
| 4,007,960 | 2/1977 | Gaffney | 297/71 |
| 4,067,249 | 1/1978 | Deucher | 297/330 |

(List continued on next page.)

FOREIGN PATENT DOCUMENTS

| | | | |
|---|---|---|---|
| 2625046 | 6/1976 | Fed. Rep. of Germany | 297/DIG. 10 |

*Primary Examiner*—Eric D. Culbreth
*Attorney, Agent, or Firm*—Kinney & Lange

[57] ABSTRACT

A geriatric chair provides easy patient entry and exit and a stable restraint-free environment for a patient seated in a chair while left unattended. The chair includes a floor engaging foot rest portion disposed forwardly of the fulcrum member and a rearward floor engaging member on a side of the fulcrum member opposite from the foot rest portion. The chair is movable about the fulcrum member between a patient entry/exit position wherein the floor engaging foot rest portion and the fulcrum member engage the floor and a patient rest position wherein the fulcrum member and the rearward floor engaging member engage the floor in a manner such that the chair cannot be moved back to the patient entry/exit position by the patient while sitting in the chair unattended. The center of gravity of the chair is movable between a position forward of the fulcrum member when in the floor engaging position and a position rearward of the fulcrum member when in the patient rest position.

21 Claims, 10 Drawing Sheets

U.S. PATENT DOCUMENTS

| | | | |
|---|---|---|---|
| 4,076,304 | 2/1978 | Deucher | 297/45 |
| 4,083,599 | 4/1978 | Gaffney | 297/131 |
| 4,141,094 | 2/1979 | Ferguson et al. | 5/81 |
| 4,185,335 | 1/1980 | Alvis | 4/251 |
| 4,231,614 | 11/1980 | Shaffer | 297/330 |
| 4,249,774 | 2/1981 | Andreasson | 297/311 |
| 4,268,054 | 5/1981 | Twitchell et al. | 280/242 |
| 4,300,249 | 11/1981 | Taylor | 4/661 |
| 4,453,732 | 6/1984 | Assanah et al. | 280/648 |
| 4,453,766 | 6/1984 | DiVito | 297/316 |
| 4,456,086 | 6/1984 | Wier et al. | 180/11 |
| 4,565,385 | 1/1986 | Morford | 280/289 |
| 4,583,758 | 4/1986 | Runion et al. | 280/644 |
| 4,593,929 | 6/1986 | Williams | 280/650 |
| 4,632,455 | 12/1986 | Schiller et al. | 297/326 |
| 4,646,374 | 3/1987 | Shafer | 5/653 |
| 4,654,904 | 4/1987 | Britz | 5/81 |
| 4,732,423 | 3/1988 | Condon | 297/DIG. 4 |
| 4,762,365 | 8/1988 | Grossfield | 297/325 |
| 4,779,881 | 10/1988 | Baker | 280/242 |
| 4,893,827 | 1/1990 | Gay et al. | 280/250.1 |
| 4,949,408 | 8/1990 | Trkla | 5/86 |
| 4,966,379 | 10/1990 | Mulholland | 280/242 |
| 4,974,905 | 12/1990 | Davis | 297/377 |
| 4,997,200 | 3/1991 | Earls | 280/648 |

Fig.8
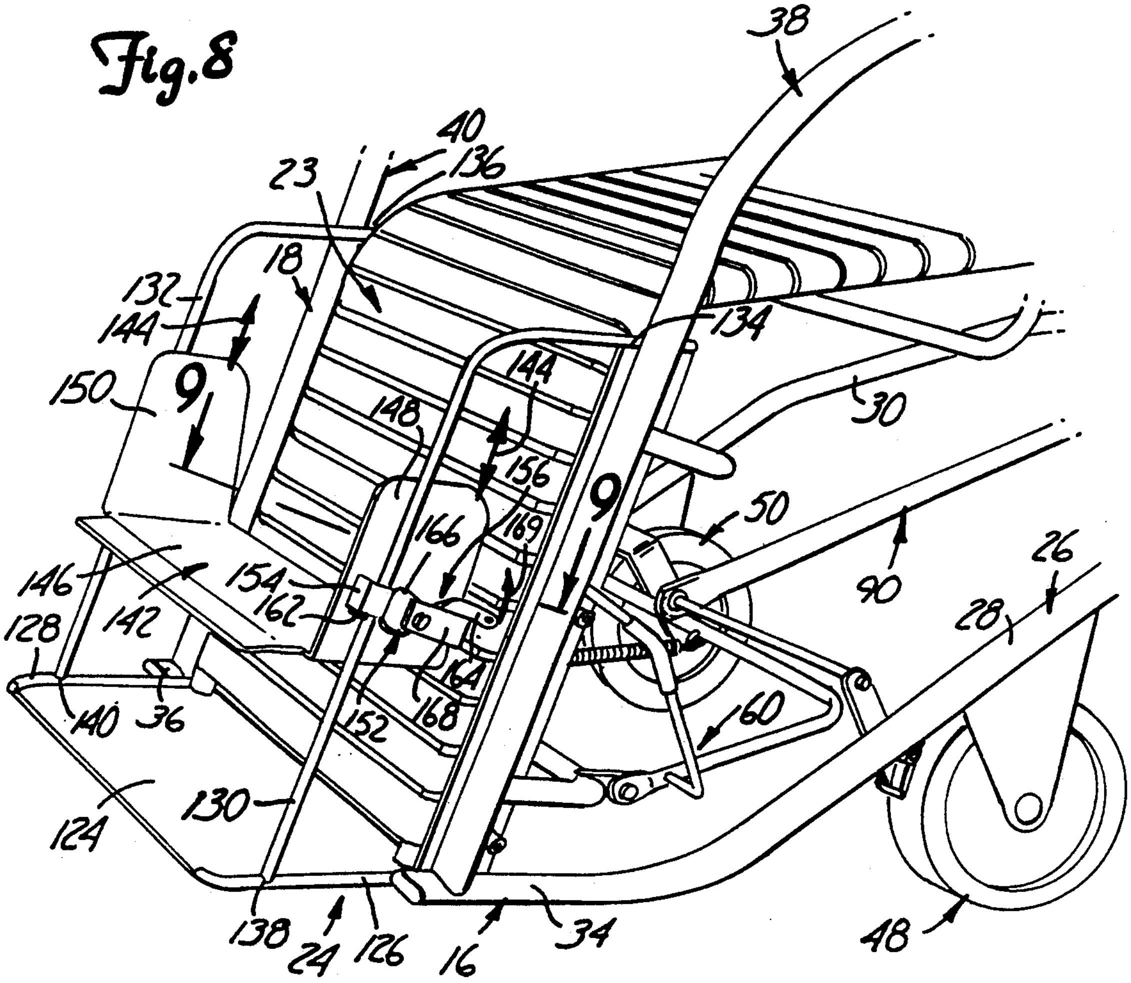
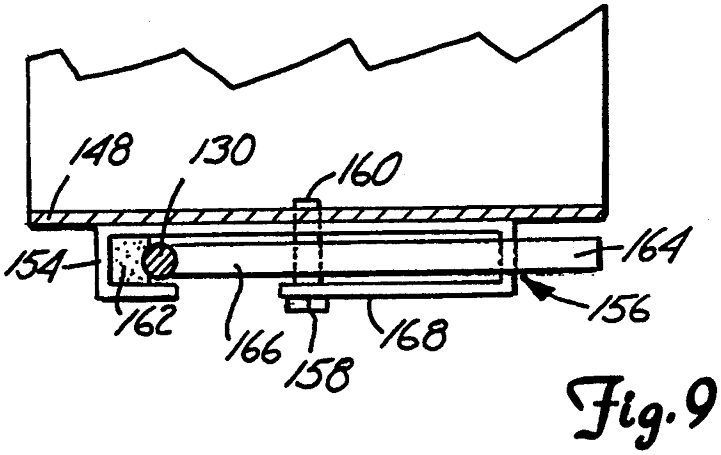
Fig.9

GERIATRIC CHAIR

BACKGROUND OF THE INVENTION

The present invention relates to geriatric chair constructions, and in particular, it relates to a geriatric chair that provides easy patient entry and a safe, stable, restraint-free environment while the patient is in the chair.

In the past, geriatric or invalid chairs typically have included mechanical restraints to keep senior citizens or invalids from falling out of the chair while left unattended. However, such restraints have come under considerable criticism as inhumane, and even dangerous at times.

There has been considerable effort in developing invalid or geriatric chairs which provide for easy patient entry or exit of the chair. Examples of some of the simpler structures developed for geriatric or invalid chairs are found in the following U.S. patents:

| Inventor | U.S. Pat. No. |
|---|---|
| McCollough | 1,534,796 |
| Nelson | 1,834,345 |
| Mallett | 2,065,233 |
| Thornton | 2,354,845 |
| Kissell | 2,487,880 |
| Reinholz | 2,722,967 |
| Nobile | 2,986,200 |
| Weil et al | 3,137,511 |
| Gates | 3,261,031 |
| Ahrent et al | 3,406,772 |
| Dalton et al | 3,712,671 |
| Twitchell et al | 4,268,054 |
| Assanah et al | 4,453,732 |
| Runion et al | 4,583,758 |
| Britz | 4,654,904 |
| Grossfield | 4,762,365 |

Examples of more complicated structures can be found in the following U.S. patents:

| Inventor | U.S. Pat. No. |
|---|---|
| Mott | 1,698,344 |
| Tracy | 2,053,852 |
| Perry | 2,550,593 |
| McLaughlin | 2,751,027 |
| Poulin | 2,869,623 |
| Bogart | 3,091,426 |
| Heyl, Jr. et al | 3,138,402 |
| Barabas | 3,147,038 |
| Stryker | 3,158,398 |
| Speckter | 3,218,102 |
| Gaffney | 3,250,569 |
| Yates et al | 3,343,871 |
| Burke | 3,479,087 |
| Rogol | 3,532,353 |
| McKee | 3,596,991 |
| Condon | 3,623,767 |
| Wrethander | 3,787,089 |
| Weant et al | 3,807,795 |
| Bogart | 3,848,845 |
| Cecchetti | 3,865,050 |
| Mashuda | 3,964,786 |
| Gaffney | 4,007,960 |
| Deucher | 4,067,249 |
| Deucher | 4,076,304 |
| Gaffney | 4,083,599 |
| Ferguson et al | 4,141,094 |
| Alvis | 4,185,335 |
| Shaffer | 4,231,614 |
| Andreasson | 4,249,774 |
| Taylor | 4,300,249 |
| DiVito | 4,453,766 |
| Wier et al | 4,456,086 |

-continued

| Inventor | U.S. Pat. No. |
|---|---|
| Morford | 4,565,385 |
| Schiller et al | 4,632,455 |
| Baker | 4,779,881 |
| Trkla | 4,949,408 |

Development has also occurred in foot rest structures for geriatric and invalid chairs. Examples of some foot rests are described in the following U.S. patents:

| Inventor | U.S. Pat. No. |
|---|---|
| Steiger | 1,917,557 |
| Jones et al | 3,379,450 |
| Williams | 4,593,929 |
| Mulholland | 4,966,379 |
| Davis | 4,974,905 |
| Earls | 4,997,200 |

However, none of the structures shown or described in the above-mentioned U.S. patents provide a solution for an invalid or geriatric chair that provides easy entry or exit by the patient while providing a safe and stable restraint free environment when the patient is left unattended in the chair.

SUMMARY OF THE INVENTION

The present invention includes a geriatric chair that provides easy entry and exit by the patient while also providing a safe and stable restraint-free environment for the patient when the patient is left unattended in the chair. The chair includes a seat structure that is tiltable about a floor engaging fulcrum. A floor engaging foot rest portion is positioned forwardly of the fulcrum and a rearward floor engaging member is positioned on a side of the fulcrum opposite from the foot rest portion. A handle is provided rearwardly of the fulcrum such that the chair is movable about the fulcrum between a floor engaging patient entry/exit position wherein the floor engaging foot rest portion and the fulcrum engage the floor and a patient rest position wherein the fulcrum and the rearward floor engaging member engage the floor such that the chair cannot be moved back to the patient entry/exit position by the patient while sitting in the chair.

In one embodiment, the fulcrum includes a set of ground engaging wheels. Preferably, a brake mechanism is provided for engaging the ground engaging wheels so that the chair is tiltable about the wheels without moving the chair along the ground.

In addition, the chair preferably also includes a stabilizer mechanism disposed forward of the fulcrum to further aid in preventing the patient from tilting the chair forward when left unattended.

The chair of the present invention also includes an adjustable foot rest adjustable to the individual needs of the particular patient sitting in the chair. Further, a dual-function cushion having a wedge-shaped portion is provided for either elevating the legs while the chair is in a patient rest position, or for placing behind the patient to aid the patient in sitting more upright, for example at meal time.

BRIEF DESCRIPTION OF THE DRAWINGS

FIG. 8 is a perspective view showing the adjustable foot rest of the chair of the present invention.

FIG. 9 is a sectional view showing the clamping mechanism of the foot rest.

DETAILED DESCRIPTION OF THE PREFERRED EMBODIMENTS

Figure 1:
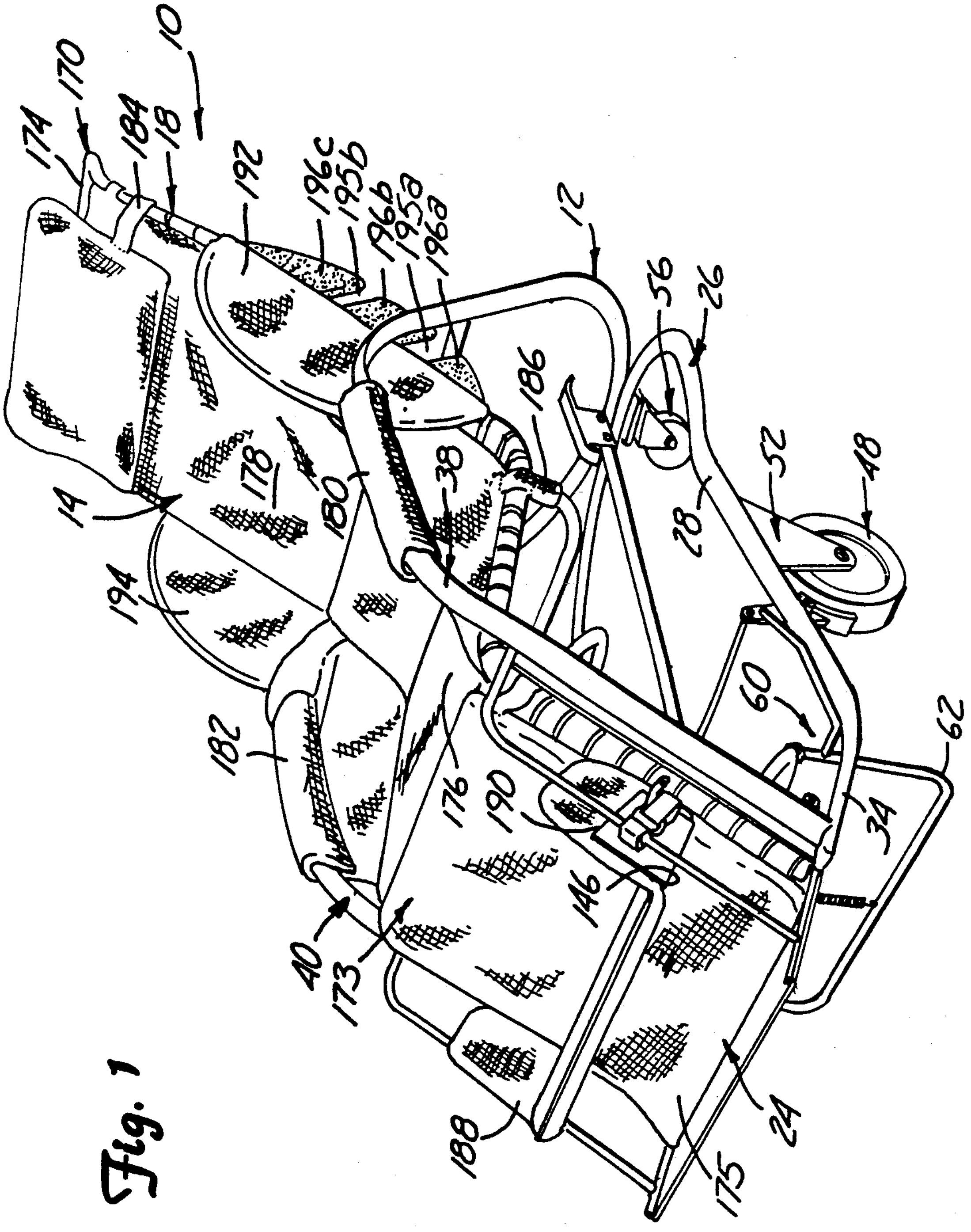
FIG. 1 is a perspective view of the chair construction of the present invention.

A chair construction of the present invention is generally indicated at 10 in FIG. 1. The chair construction includes a chair support structure 12 and a chair cushion system 14.

Figure 2:
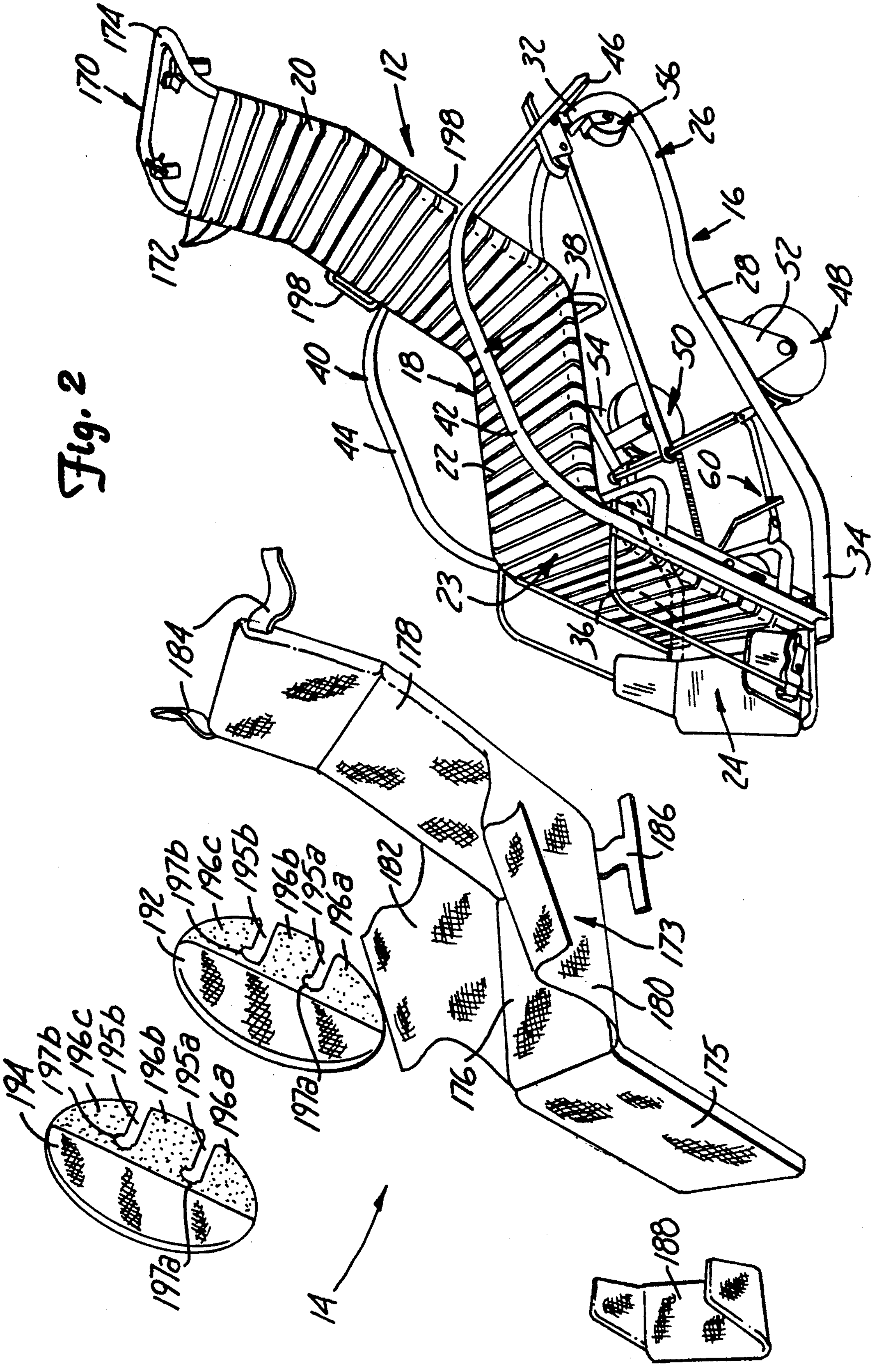
FIG. 2 is an exploded perspective view of the chair construction of the present invention.

The chair support structure 12, as better illustrated in FIG. 2, includes a chair base 16 and a seat structure 18 supported by the chair base 16. The seat structure 18 includes a back portion 20, a seat portion 22, and a leg rest portion 23. A foot rest mechanism 24 is secured to the leg rest portion 23. The base and the seat structure are preferably made of a tubular metal, although any suitable material having the structural characteristics necessary are within the scope of the present invention.

The base 16 includes a wheel support member 26 that includes left and right wheel support portions 28 and 30, respectively, which define the general perimeter of the base 16. The wheel support portions 28 and 30 converge at a rearward most point of confluence 32, and each portion 28 and 30 has a forwardly extending ground engaging end portion 34 and 36, respectively.

The base 16 further includes left and right arm supports 38 and 40. The arm supports 38 and 40 are joined to the forwardly extending ground engaging end portions 34 and 36, respectively, and extend therefrom upwardly to provide arm support sections 42 and 44 along opposite sides of the seat structure 18. Arm supports 38 and 40 then extend downwardly and rearwardly and meet at junction point 46 where the arm supports 38 and 40 are attached to the wheel support member 26.

Left and right ground engaging wheels 48 and 50 are rotatably attached to the wheel support member 26 by respective wheel support brackets 52 and 54. The wheels 48 and 50 are positioned approximately midway between the front and back end of the wheel support member 26. A ground engaging rearwardly positioned caster 56 is also attached to the wheel support member 26 for supporting the base 16. The caster 56 permits the chair construction of the present invention to be turned.

Figure 3:
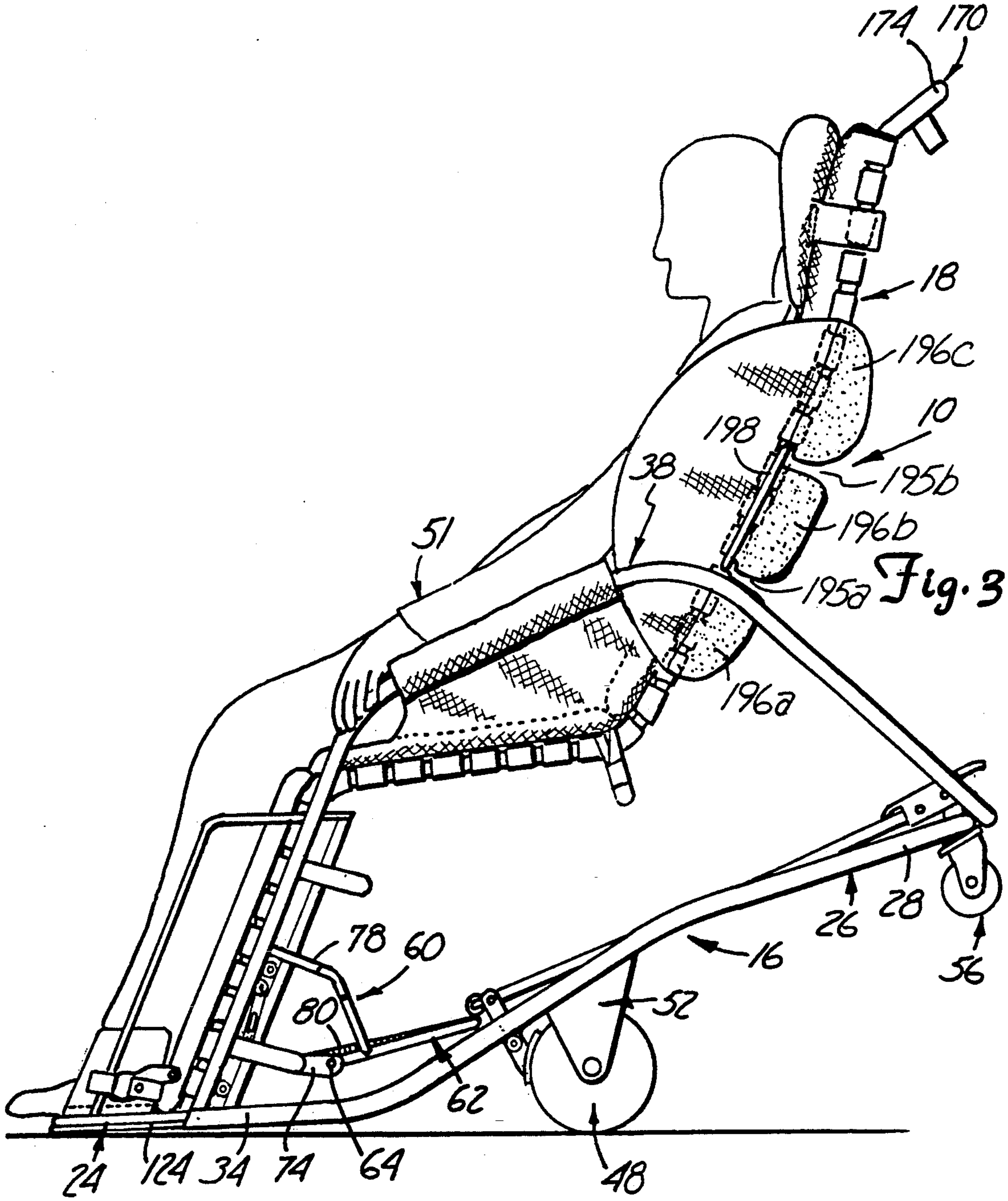
FIG. 3 is a side elevational view of the chair in a patient entry/exit position.
Figure 4:
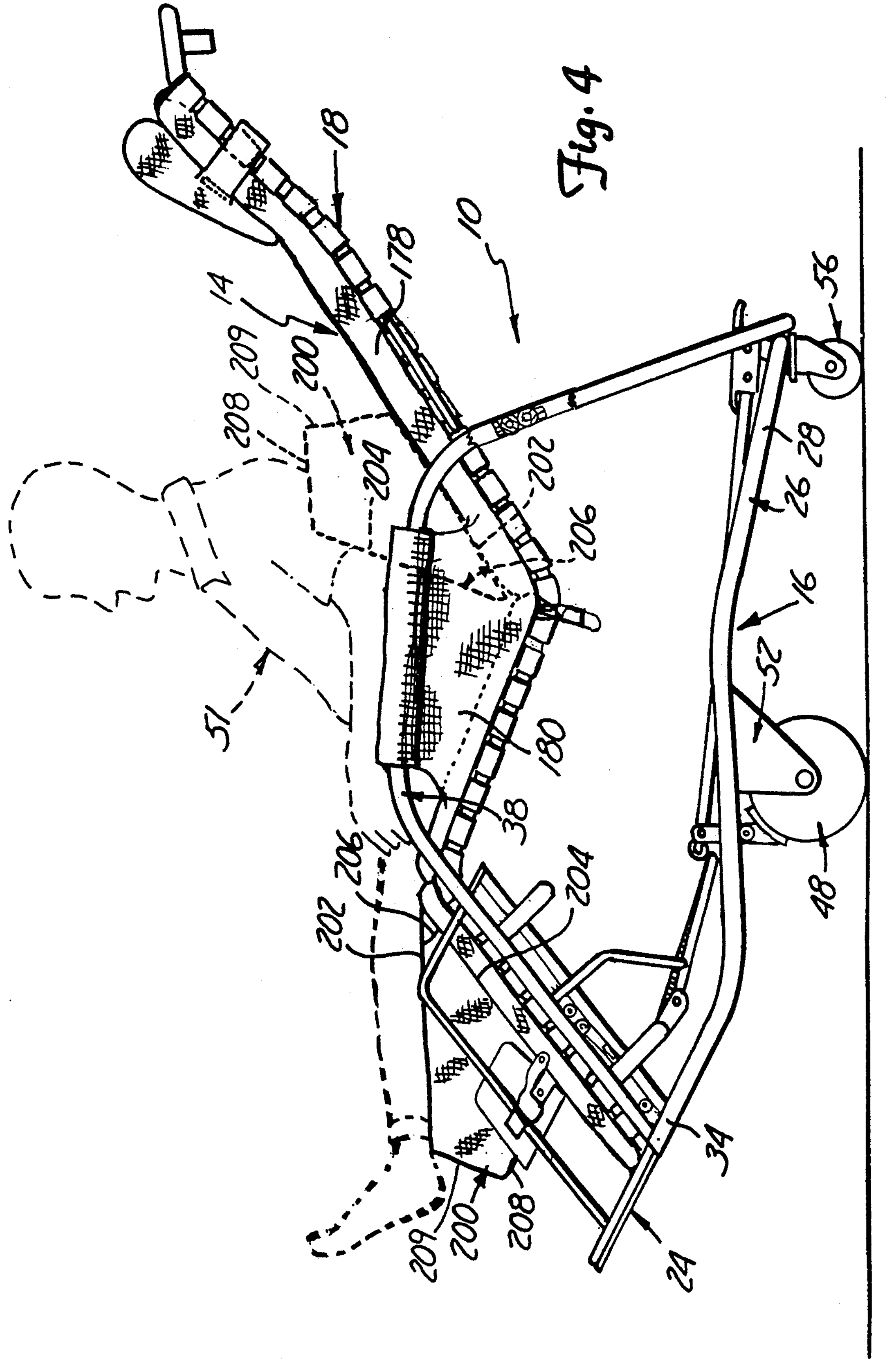
FIG. 4 is a side elevational view of the chair in a patient rest/transport position.

The base 16 not only permits movement of the chair 10 along the ground using the wheels 48 and 50 and the caster 56, but also provides easy entry and seating of a patient with minimum effort by an attendant using the chair of the present invention. As best illustrated in FIGS. 3 and 4, the wheels 48 and 50 (the wheel 50 not being specifically illustrated in FIGS. 3 and 4) act as a fulcrum so that the chair 10 can be pivoted from a stable patient entry/exit position, such as illustrated in FIG. 3, to a stable transport/rest position, such as illustrated in FIG. 4.

Although the wheels 48 and 50 are used in the preferred embodiment illustrated, in an alternative embodiment in which the chair does not include a transport position but only a rest position, wheelless legs (not shown) are substituted for the wheels 48 and 50 and caster 56. The wheelless legs that are substituted for the wheels 48 and 50 are used as the fulcrum in a similar fashion. The only difference between the wheelless chair construction (not shown) and the chair construction illustrated in the figures is the lack of wheels.

Figure 5:
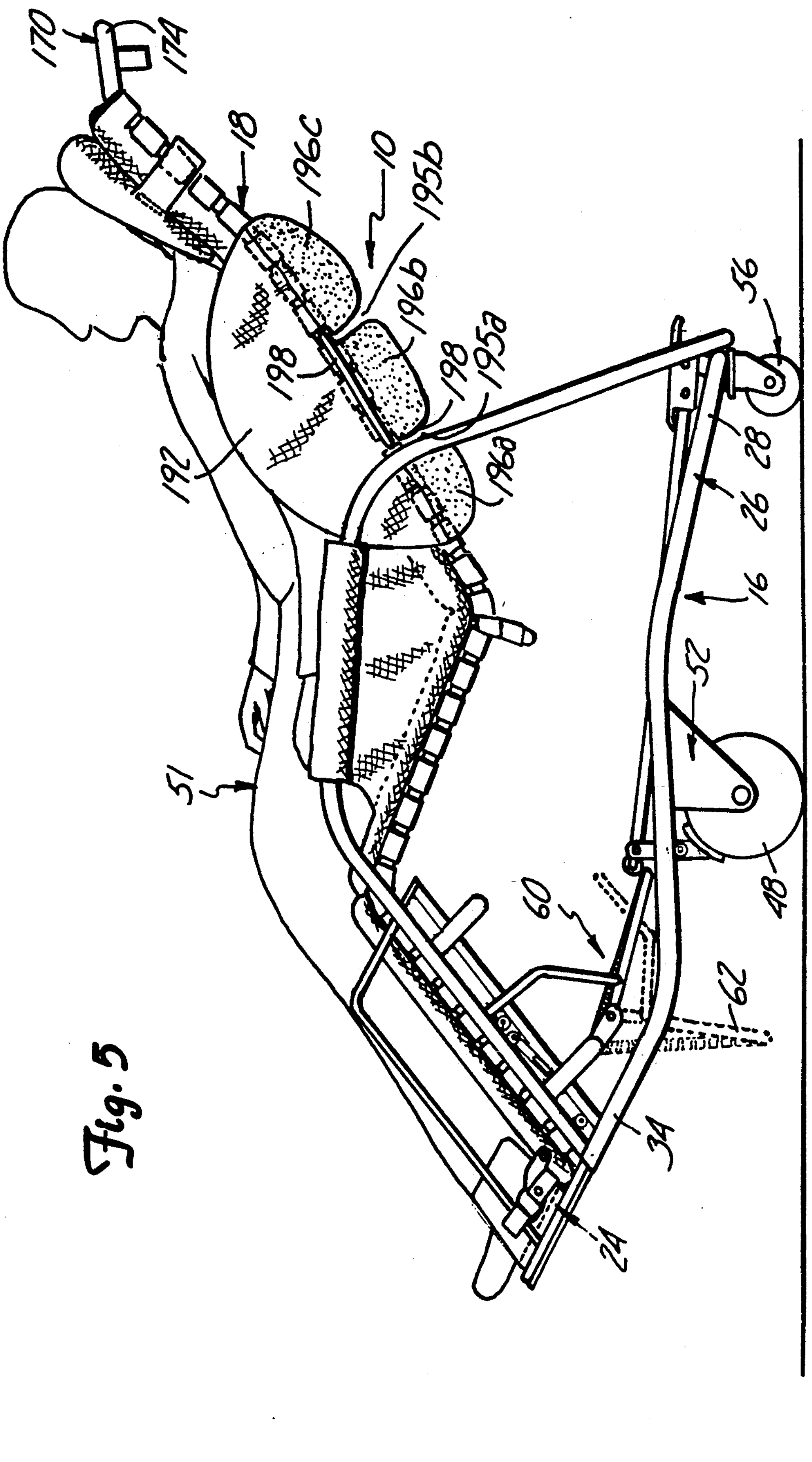
FIG. 5 is an additional side elevational view of the chair of the present invention.

Not only does the present invention provide easy entry/exit but it permits an attendant to seat a patient in the chair with minimal effort. Once a patient 51 is positioned within the chair as illustrated in FIG. 3, the chair is tilted rearwardly to a transport/rest position, as illustrated in FIG. 5.

As the patient and the chair are tilted rearwardly, the center of gravity of the chair and the patient moves from a forward position of the wheels 48 and 50 to a position rearward of the wheels 48 and 50. Prior to tilting the chair rearwardly, the center of gravity is located approximately $5\frac{5}{8}$ inches forward of the axis of the wheels 48 and 50 providing a stable chair for patient entry. After the chair is tilted rearwardly, the patient is retained stably in the chair in a restraint-free mode since the center of gravity has shifted to a position rearward of the wheels 48 and 50. In one embodiment, the center of gravity without the patient in the chair is located approximately $3\frac{5}{8}$ inches rearward of the axis of the wheels 48 and 50. The chair cannot be tipped forward by the patient since the center of gravity is disposed sufficiently rearward of the wheels 48 and 50. With the patient unable to tilt the chair forward, the need for restraints is eliminated and a restraint-free environment is provided.

Figure 6:
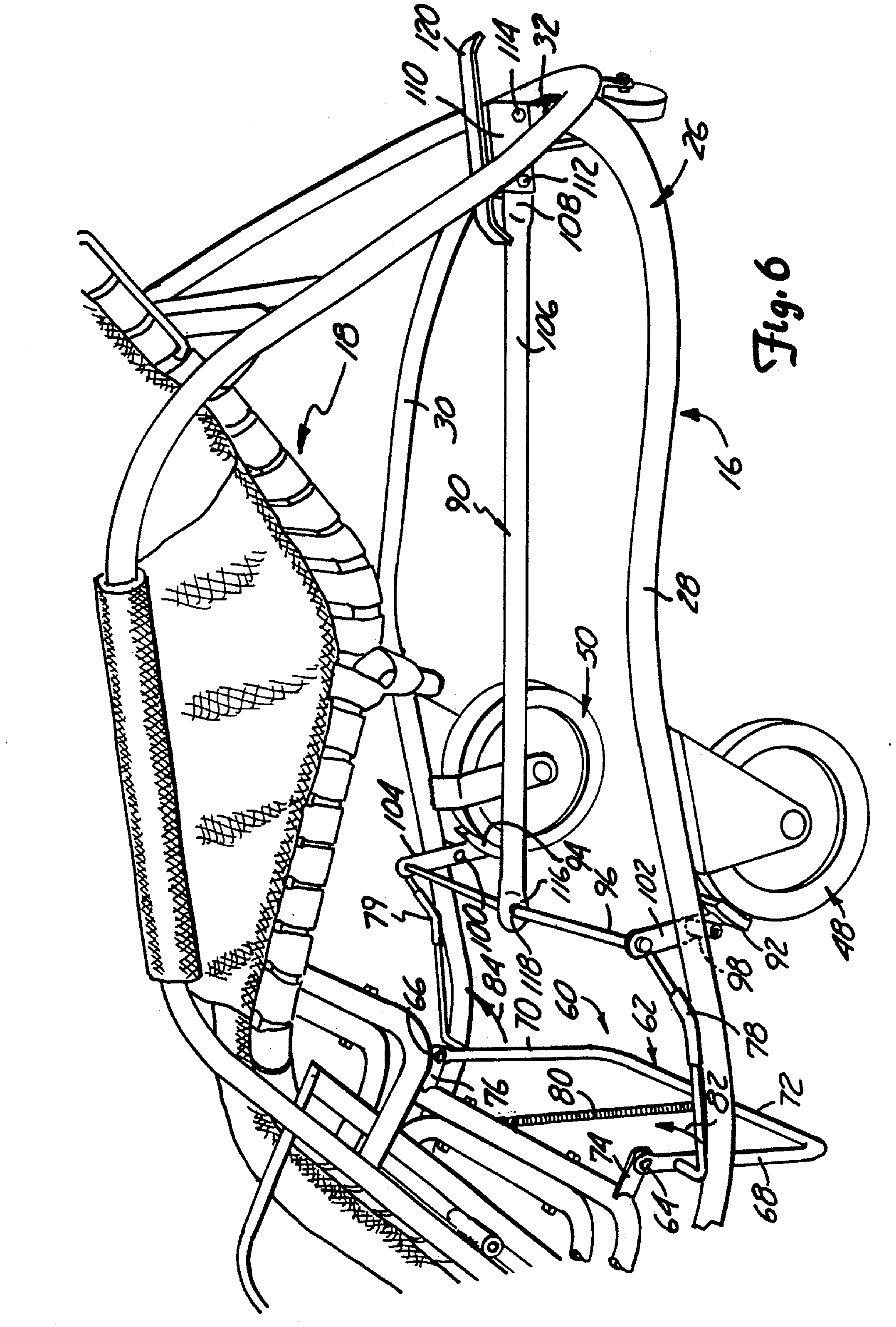
FIGS. 6 and 7 are perspective views illustrating the brake and the stabilizer mechanism of the chair of the present invention.
Figure 7:
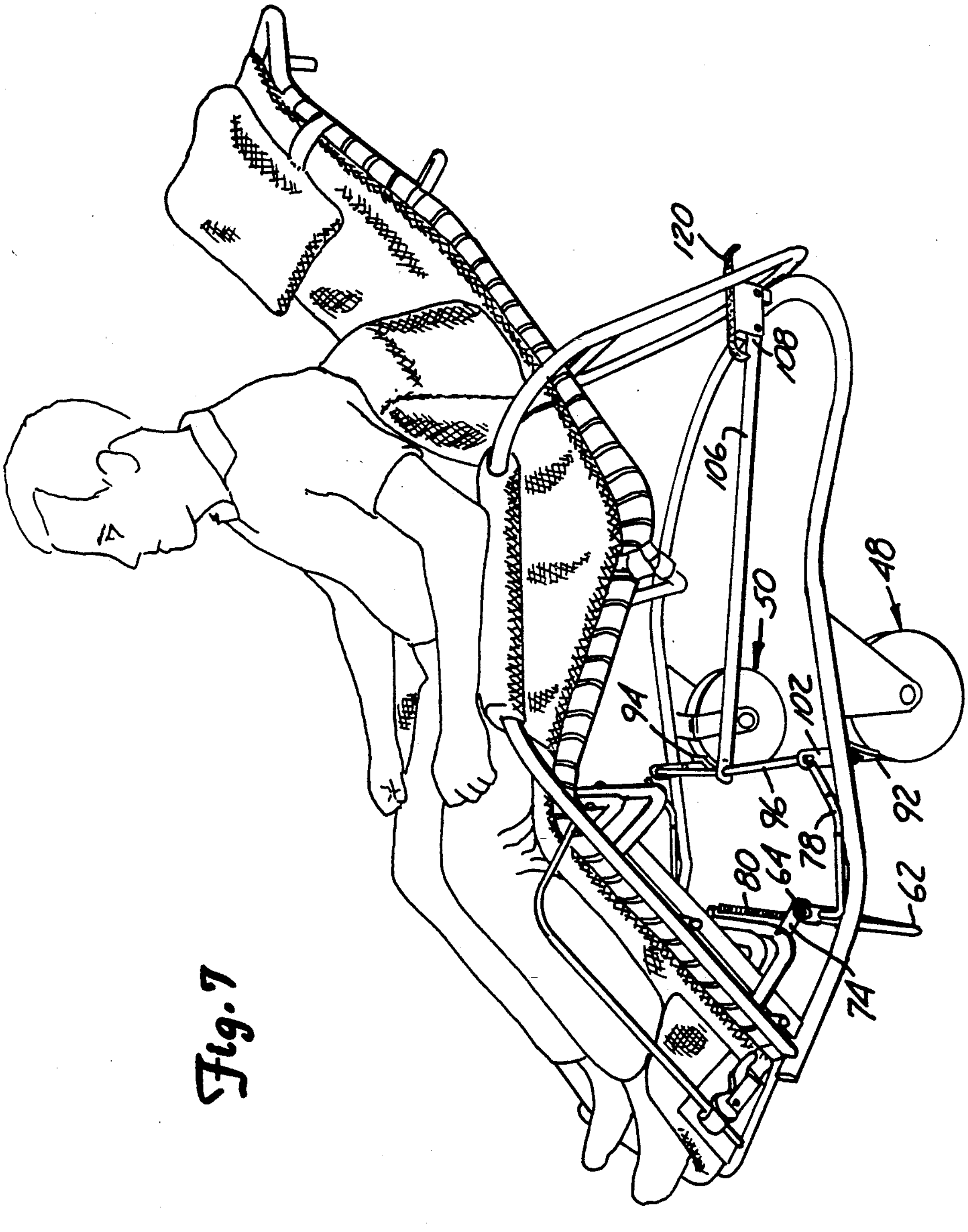

A further aspect of the present invention includes a retractable stabilizer mechanism 60, best illustrated in FIG. 6, attached to the seat structure 18 that is disposed forward of the wheels 48 and 50. The stabilizer mechanism 60 includes a floor engaging bar 62 that is pivotally attached to the seat structure 18 at left and right coaxially disposed pivots 64 and 66. The bar 62 includes left and right leg portions 68 and 70 and a floor engaging connecting bar portion 72 that connects the left and right leg portions. Left and right brackets 74 and 76, which are welded on to the seat structure 18, are in pivotal connection with the leg portions 68 and 70, respectively. The mechanism 60 further includes left and right handles 78 and 79 which extend in left and right outward directions, respectively, from the center of the seat structure. The left and right handles extend sufficiently outwardly to rest against top portions of the left and right wheel support portions 28 and 30, respectively. A spring 80 is attached at one end to the seat structure 18 and at another end to the connecting floor engaging portion 72 of the floor engaging bar 62.

In use, the stabilizer mechanism 60 is actuated by pivoting the floor engaging bar 62 about the pivots 64 and 66 by engaging either the left handle 78 or the right handle 79 from either the left or the right side of the chair of the present invention. To position the stabilizer mechanism 60 in a floor engaging position, either the left or right handle 78 or 79 is moved until the respective handle rests against the respective wheel supports portions 28 and 30 of the base 16. The spring 80 provides a force that retains the bar 62 in a floor engaging position by holding the left and right handles 78 and 79 against the respective wheel support portions 28 and 30. When the bar 62 is in a floor engaging position, the spring is stretched and positioned forward of the axis of the pivots 64 and 66.

To retract the bar 62 to an upward non-floor engaging position, either the left or right handle 78 or 79 is moved in a general direction indicated by arrows 82 and 84 until ends of the left and right handles 78 and 79 abut against the seat structure 18, as best illustrated in FIG. 3 (with only the left handle 78 being shown therein). The spring 80 is also moved rearwardly past the axis of the pivots 64 and 66 and is left in a stretched state thereby retaining the bar 62 in a non-floor engaging position. When in a floor engaging position, the stabilizer mechanism 60 assures that a patient sitting within the chair cannot tip the chair forward.

A brake mechanism 90 is included in the present invention for braking the wheels 48 and 50, as best illustrated in FIG. 6. The brake mechanism 90 engages the wheels 48 and 50 so that the chair can be tilted from the patient entry/exit position, as illustrated in FIG. 3, to the transport/rest position, as illustrated in FIG. 4. The brake mechanism 90 also prevents the chair of the present invention from being moved along the ground.

The brake mechanism 90 includes brake pads 92 and 94, which engage the wheels 48 and 50, respectively, to prevent the wheels from rotating. A brake cross bar 96 positions the pads 92 and 94 to and from a wheel engaging position. The brake cross bar 96 is pivotally secured to the left and right wheel support portions 28 and 30 of the base 16 with downwardly extending brake leg portions 102 and 104 at approximately coaxial pivots 98 and 100, all respectively.

A brake activating bar 106 is pivotally attached to the wheel support member 26 at an end 108 by a coupling 110. The coupling 110 is pivotally attached to the bar 106 at pivot 112 and pivotally attached to the member 26 at pivot 114. The activating bar 106 at an opposite end 116 includes an aperture 118 through which the cross bar 96 extends resulting in pivotal attachment of the bar 106 to the cross bar 96. The cross bar 96 is sufficiently flexible so that the cross bar acts as a spring. When the coupling 110 is aligned along substantially the same axis as the bar 106, the pads 92 and 94 will be in a wheel engaging position, and will be held in a wheel engaging position due to the spring action of the cross bar 96.

A foot pedal 120 is fixedly secured to the bar 106 proximate an end 108. The foot pedal 120 extends rearwardly to a position past the wheel support member 26 such that the pedal 120 is engagable either from a top or a bottom position by an attendant's foot.

To disengage the pads 92 and 94 from a wheel engaging position, the pedal 120 is engaged on a rearward end, lifting the bar 106 and simultaneously pivoting the coupling 110 in an upward direction thereby relieving the pads 92 and 94 from the spring force of the bar 96. The pads 92 and 94 are pivoted about the pivots 98 and 100 away from the wheels 48 and 50.

To engage the brake mechanism 90, the pedal 120 is stepped on by the attendant at a forward end, which forces the bar 106 forward while simultaneously aligning the bar 106 and the coupling 110 along the same general axis and against the spring force of the cross bar 96. The spring force of the cross bar 96 then applies the pads 92 and 94 against the wheels 48 and 50. The brake mechanism 90 due to the spring action of the bar 96 is self-adjusting with respect to tolerances and wear on each wheel 48 and 50 independently.

The foot rest mechanism 24 includes an adjustable bottom floor engaging plate 124 that is movably secured to the leg rest portion of the seat structure, 18 and to ground engaging end portions 34 and 36 of the wheel support portions 28 and 30, as best illustrated in FIG. 8. In an uppermost position, the plate 124 is disposed along substantially the same plane as the forwardly extending ground engaging end portions 34 and 36 so that when the chair of the present invention is tilted to the patient entry position, as illustrated in FIG. 3, the plate 124 and the ground engaging end portions 34 and 36 act in unison in engaging the floor. The plate 124 is further secured in position by left and right bars 126 and 128. The bars 126 and 128 extend outwardly and forwardly from the leg rest portion 23. The plate 124 is preferably welded to the bars 126 and 128.

Figure 10:
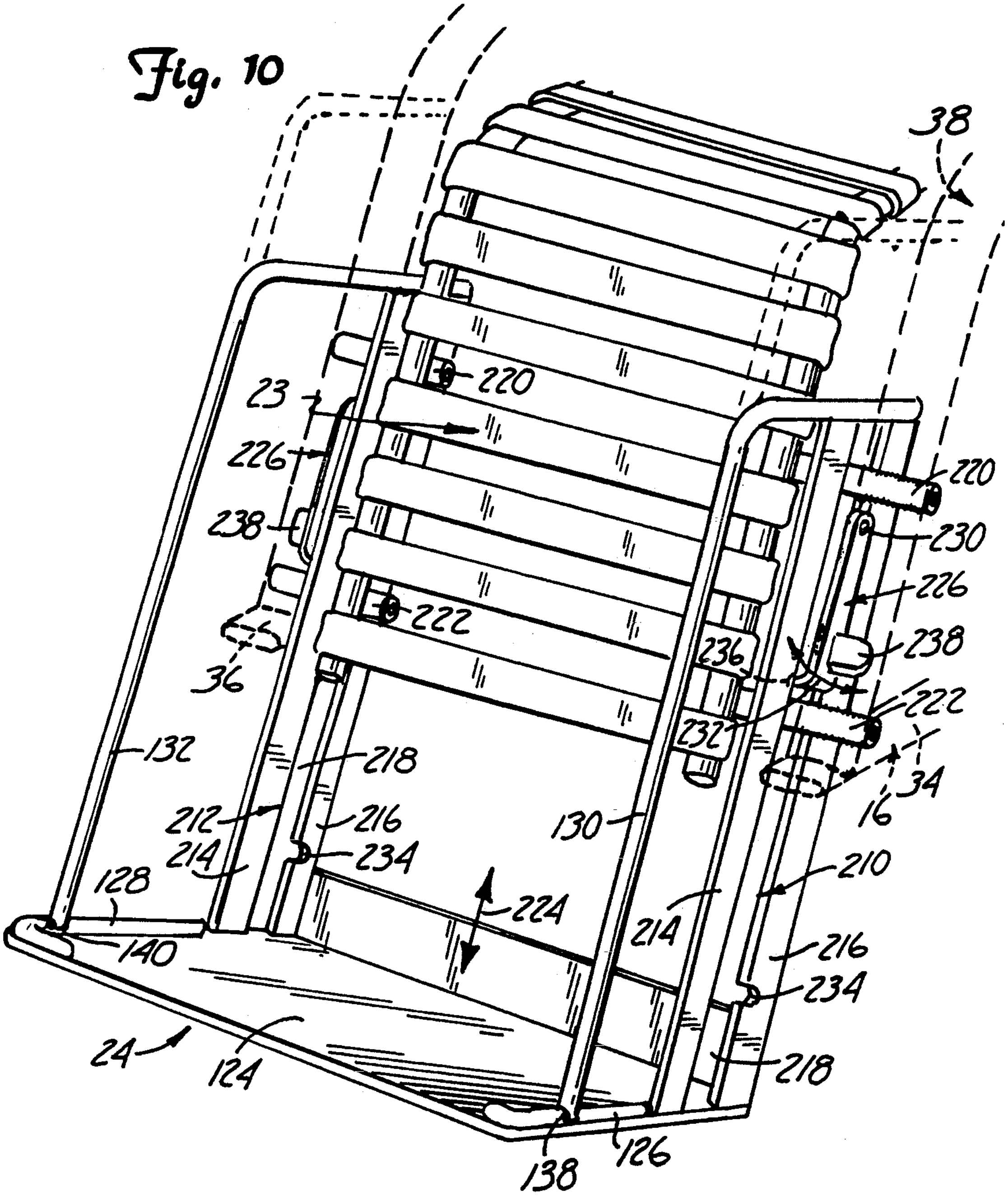
FIG. 10 is a perspective view of the foot rest mechanism in a lower position with portions of the chair illustrated in broken lines, and with the infinitely adjustable foot rest portion eliminated, for purposes of clarity.

Foot rest guide and support bars 130 and 132 at upper end portions 134 and 136 are attached to left and right bearing engaging guide bar sets 210 and 212, respectively, as illustrated in FIG. 10. The guide and support bars 130 and 132 extend outwardly from the respective guide bar sets 210 and 212, and then extend downwardly and are fixedly attached at lower ends 138 and 140 to the bars 126 and 128 to provide further support and rigidity to the plate 124.

The foot rest portion 24 also includes an infinitely adjustable foot rest plate 142 that is adjustable in general upward and downward directions above the plate 124 as indicated by arrows 144 in FIG. 8. The plate 142 includes an adjustable foot rest plate portion 146 and integrally formed left and right upwardly extending plate supports 148 and 150, respectively.

Each plate support, 148 and 150, includes a clamping mechanism 152 for clamping respective guide and support bars 130 and 132. Only the clamping mechanism 152 of the plate support 148 will be described since the plate support 150 includes an identical clamping mechanism.

As best illustrated in FIG. 9, the clamping mechanism 152 includes a u-shaped guide bar receiving member 154 and a cammed guide bar engaging lever 156. The guide bar receiving member 154 is fixedly attached to the plate support 148, such as by welding. The lever 156 is pivotally attached to the plate support 148 by a bolt 158 and a nut 160 engaging the bolt 158. A rubber inset 162 is disposed between the guide and support bar 130 and the receiving member 154. Although rubber is preferred for the inset 162, any type of resilient material will perform satisfactorily.

The lever 156 includes a handle portion 164 disposed on one side of the bolt 158 and nut 160 and a cammed guide bar engaging portion 166 disposed on an opposite side such that if the lever is moved upwardly, in the direction indicated by arrow 169 in FIG. 8, the cammed guide bar engaging portion 166 is pivoted from engagement of the bar 130. Similarly, when the handle portion is pushed in a direction opposite to arrow 169, the cammed guide bar engaging portion 166 comes into engagement with the guide and support bar 130 frictionally retaining the plate support 148 in a selected position. Frictional engagement occurs between the guide and support bar 130, the inset 162, and the cammed guide bar engaging portion 166.

The clamping mechanism 152 also includes a stop bracket 168 which is disposed to stop the handle portion 164 at a position in which the cammed guide bar engaging portion 166 fully engages the bar 130 for optimal frictional clamping force.

The plate support 150 is clamped in a similar manner using a clamping mechanism (not shown) essentially identical to clamping mechanism 152. Clamping both clamping mechanisms of plate supports 148 and 150 positions the foot rest plate portion 146 at a selected height along the bars 130 and 132 so that support can be provided for the feet of a particular patient. The adjustable foot rest plate portion 146 provides a bottom support to the feet and prevents pain associated from having feet hang for extended periods of time without any bottom support. The adjustable foot rest plate portion 146 is adjustable to an infinite number of positions along the bars 130 and 132 so that an exact adjustment can be made for the patient in the chair.

The plate 124 and foot rest guide and support bars 130 and 132 are movable from an uppermost position, as illustrated in FIG. 8, to a lower position, as best illustrated in FIG. 10 to accommodate longer legged patients. The bearing engaging guide bar sets 210 and 212 permit adjustment of the plate 124 in a downward and upward direction. Each guide bar set 210 and 212 includes forward and rearward guide bars 214 and 216. The forward and rearward guide bars 214 and 216 define slots 218. It will be appreciated that the guide bar set 212 has like elements and operates in a like manner.

Figure 11:
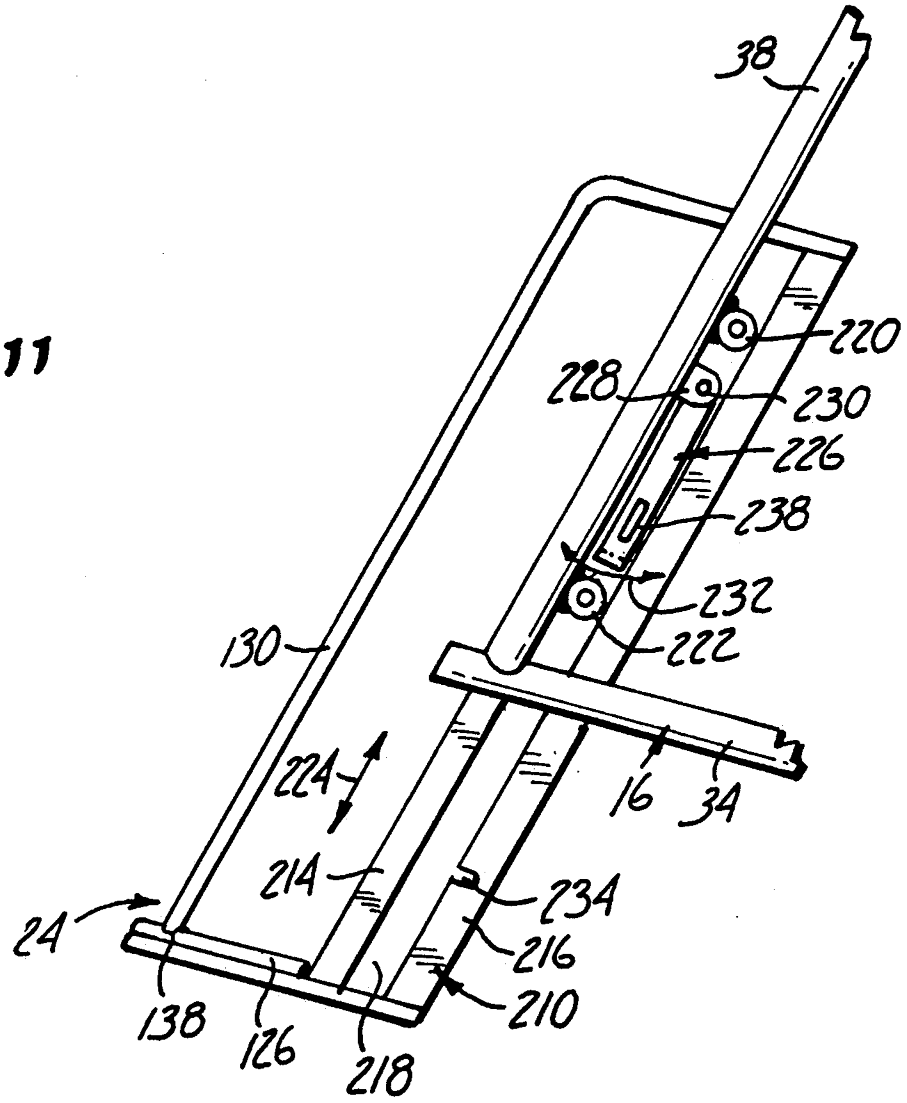
FIG. 11 is a side elevational view of the foot rest mechanism in a lower position.

As best illustrated in FIG. 11, wherein only guide bar set 210 is illustrated, upper and lower bearings 220 and 222 are fixedly attached to the arm support 38. The bearings 220 and 222 extend into the slot 218 for guiding the foot rest mechanism generally along the direction indicated by arrows 224.

Although the infinitely adjustable foot rest plate 142 is not illustrated in FIGS. 10 and 11, it will be appreciated that once the foot rest plate is lowered, the adjustable foot rest plate 142 can then be adjusted along the foot rest guide and support bars 130 and 132 to provide the longer legged patient with a more accurately adjusted foot rest plate.

To secure the plate 124 in its uppermost position, a pivot arm 226 is pivotally attached to the arm rest 38 by a bracket 228 and a pivot pin 230 is movable in the general direction as indicated by arrows 232. A catch in the form of notch 234 in the rearward guide bar 216 is engaged by an inwardly bent end portion 236 of the pivot arm 226, as best illustrated in FIG. 10. A tab 238 extends outwardly from the pivot arm 226 to aid in moving the pivot arm 226 out of the notch 234. The pivot arm 226 will fall into the notch 234 due to gravity when the plate 124 is moved to its uppermost position To release the plate, the tab 238 is engaged to move the pivot arm 226 from the notch.

The seat structure 18, as illustrated in FIG. 2, includes a frame 170, which is preferably made of a continuous metal tubing member bent to form the configuration of seat structure 18 including the back portion 20, the seat portion 22, and the leg rest portion 23. A plurality of flexible webbing sections 172 are strung across the frame 170 and anchored to the frame 170 in a conventional manner. The webbing sections 172 are made of a flexible polyvinyl chloride and are generally taut but yieldable providing a cushioning effect. The webbing sections 172 are preferably included along the back portion 20, the seat portion 22, and the leg rest portion, 23.

The frame 170 further includes a handle portion 174 disposed at the top of the seat structure 18. The handle portion 174 is used by the attendant to both tilt the chair into the entry position, as illustrated in FIG. 3, and to push the chair in the transport/rest position, as illustrated in FIG. 5.

The chair of the present invention also includes a cushion system 14 for attachment to the seat structure 18. The cushion system 14 includes a primary cushion 173 that includes a leg cushion portion 175, a seat cushion portion 176, and a back cushion portion 178. The primary cushion 173 also includes left and right side seat cushion portions 180 and 182. The primary cushion 173 is secured to the seat structure 18 preferably by an upper set of straps 184 and a lower set of straps (only one being illustrated) 186, as best illustrated in FIG. 1. The left and right side cushions 180 and 182 have outer edge portions, which wrap around and are secured to the left and right arm supports 38 and 40, respectively, using hook and loop-type fasteners. Although a specific fastening system has been described, any suitable mechanism for fastening the seat cushion of the present invention to the seat structure 18 is within the scope of the present invention.

The cushion system 14 further includes a foot rest cushion 188, which rests on the adjustable foot rest plate portion 146. The foot rest cushion 188 includes two pockets 190 (only one being shown) disposed at opposite ends of the cushion 188. The plate supports 148 and 150 are inserted into the pockets 190 to secure the foot rest cushion 188 in place.

The present invention further includes left and right side cushions 192 and 194. The side cushions 192 and 194 have a rigid panel base and include a plurality of rigid projections 196*a*, 196*b*, and 196*c* that define gravity notches 195*a* and 195*b* therebetween. Preferably, the side cushions 192 and 194 include three projections. The seat structure 18 includes a wire loop 198 extending from both the left and right side of the frame 170. The side cushions 192 and 194 are attached to the seat structure 18 by inserting the middle projection 196*b* in to the wire loop 198 with the wire loop engaging notches 195*a* and 195*b*, the attachment of the cushion 192 being best illustrated in FIG. 5. Each notch 195*a* and 195*b* includes a retaining notch portion 197*a* and 197*b*, respectively, that extends in a generally upward direction and engages the wire loop preventing accidental disengagement of the cushions 192 and 194. The bottom projection 196*a* is disposed between the arm support 38 and the frame 170 of the seat structure 18, which further aids in retaining the cushion 192 in a generally upright position. The cushions 192 and 194 help maintain a patient within the seat structure 18 by preventing the patient from slumping out of the chair along the chair sides.

The present invention also includes a dual-purpose back support/foot support cushion 200 as illustrated in FIG. 4. The dual-purpose cushion 200 is trapezoidal in cross section and preferably extends across the width of the seat structure 18. The cushion 200 includes surfaces 202 and 204, which meet forming an acute angle 206, thereby forming a cushion portion that is "wedge shaped". The cushion also has surfaces 208 and 209 that form the other two sides of the trapezoidal cross section.

With the surface 202 facing upwardly, the cushion 200 may be used as a foot support for elevating the patient's legs by resting the surface 208 against the adjustable foot rest plate portion rest 146. The wedge-shaped portion is nearest the seat structure when on the foot rest plate portion 146.

The cushion 200 may also be used as a back support cushion (as illustrated in broken lines) for placing behind the patient to aid the patient in sitting more upright, for example at meal time. The cushion is placed on the seat structure 18 such that the surface 204 faces the patient 51 and the surface 202 faces the seat structure 18 with the wedge shape being nearest the seat portion.

Although the present invention has been described with reference to preferred embodiments, workers skilled in the art will recognize that changes may be made in form and detail without departing from the spirit and scope of the invention.

What is claimed is:

1. A geriatric chair comprising:

a chair base;

a seat portion;

a fulcrum member disposed below the seat portion wherein the fulcrum member comprises at least one axle including at least one freely rotatable ground engaging wheel attached to the axle;

a floor engaging foot rest portion positioned forwardly of the fulcrum member;

a rearward floor engaging member on a side of the fulcrum member opposite from the foot rest portion;

a handle member disposed rearwardly of the fulcrum member such that the chair is movable about the fulcrum member between a floor engaging patient entry/exit position wherein the floor engaging foot rest portion and the fulcrum member engage the floor and a patient rest position wherein the fulcrum member and the rearward floor engaging member engage the floor and a center of gravity of the chair shifts between a position forward of the fulcrum member and a position rearward of the fulcrum member when the chair is moved between the positions; and a brake mechanism for engaging said at least one wheel wherein the brake mechanism includes:

means for engaging said at least one wheel to stop the wheel's rotation including a wheel engaging pad pivotally mounted to the base for engaging the wheel;

spring force means for biasing the means for engaging against the wheel including a spring bar extending between and attached at opposite ends to the pivotally mounted pad and another pivotally mounted pad;

a foot pedal member secured to the base for actuating the means for engaging in either a wheel engaging position or a non-wheel engaging position; and linkage means for connecting the foot pedal member with the means for engaging and the spring force means, the linkage means including an activating bar pivotally attached at one end to the spring bar and pivotally attached at another end to the foot pedal.

2. The chair of claim 1 wherein the rearward floor engaging member is a caster.

3. The chair of claim 1 wherein the floor engaging foot rest portion includes a floor engaging plate member.

4. The chair of claim 1 wherein the seat portion, the floor engaging foot rest portion and the handle member form a seat structure and further including a base on which the seat structure rests and is attached, and wherein the fulcrum member and the rearward floor engaging member extend from the base to engage the floor.

5. The chair of claim 4 wherein the base further includes handle members disposed on opposite sides of the seat structure.

6. The chair of claim 4 and further including a retractable stabilizer mechanism attached to the base for engaging the floor at a position forward of the fulcrum member when the chair is in a patient rest position.

7. The chair of claim 6 wherein the stabilizer mechanism includes a floor engaging bar pivotally attached to the seat structure, and further including a spring means and stop means engaging the base, both the spring means and stop means for retaining the floor engaging bar in a floor engaging position.

8. The chair of claim 4 wherein the floor engaging foot rest portion includes an adjustable foot rest mechanism.

9. The chair of claim 8 wherein the adjustable foot rest mechanism includes an adjustable foot rest plate, left and right guide bars spaced away from the seat structure substantially parallel thereto and disposed on opposite sides of the adjustable foot rest plate; and left and right clamping means attached to the adjustable foot rest plate for clamping respective left and right guide bars such that the adjustable foot rest plate is movable to a selected position along the guide bars.

10. The chair of claim 9 wherein both the left and right clamping means frictionally clamp respective left and right guide bars.

11. The chair of claim 10 and further including left and right wire loops extending outwardly from the sides of the seat structure in opposing directions, and left and right side barrier cushions having tab members insertable into the respective left and right wire loops for attachment of the cushions to the seat structure.

12. The chair of claim 8 wherein the adjustable foot rest mechanism includes a floor engaging plate, and means for adjusting the position of the floor engaging plate.

13. The chair of claim 12 wherein the means for adjusting the position of the floor engaging plate further includes bearing means attached to the seat structure, and guide bar means rotatably engaging the bearing means and being fixedly attached to the floor engaging foot plate such that the floor engaging foot plate is movable relative to the seat structure.

14. The chair of claim 13 and further including catch means for retaining the floor engaging plate in an uppermost position.

15. The chair of claim 4 and further including left and right side patient barriers detachably attachable to left and right sides of the seat portion of the seat structure to prevent a patient from falling out of the chair along the chair's sides.

16. The chair of claim 4 and further including a dual-function back support and foot support cushion having an acute angle portion formed by first and second acute angle cushion sides wherein the cushion in a first function is disposed on the foot rest portion with the acute angle portion being the nearest portion of the cushion to the seat portion of the seat structure, and wherein the cushion in a second function rests against the back portion of the seat structure with the acute angle portion being the nearest portion of the cushion to the seat portion of the seat structure.

17. A geriatric chair comprising:
- a chair base;
- a seat portion;
- a floor engaging fulcrum member disposed below the seat portion;
- a floor engaging foot rest portion positioned forwardly of the fulcrum member;
- a rearward floor engaging member on a side of the fulcrum member opposite from the foot rest portion;
- a handle member disposed rearwardly of the fulcrum member such that the chair is movable about the fulcrum member between a floor engaging patient entry/exit position wherein the floor engaging foot rest portion and the fulcrum member engage the floor and a patient rest position wherein the fulcrum member and the rearward floor engaging member engage the floor and a center of gravity of the chair shifts between a position forward of the fulcrum member and a position rearward of the fulcrum member when the chair is moved between the positions;
- a retractable stabilizer mechanism attached to the base for engaging the floor at a position forward of the fulcrum member when the chair is in a patient rest position; and wherein:
- the seat portion, the floor engaging foot rest portion and the handle member form a seat structure which rests on and is attached to the chair base; and
- the fulcrum member and the rearward floor engaging member extend from the base to engage the floor.

18. The chair of claim 17 wherein the mechanism includes a floor engaging bar pivotally attached to the seat structure, and further including a spring means and stop means engaging the base, both the spring means and stop means for retaining the floor engaging bar in a floor engaging position.

19. A geriatric chair comprising:
- a chair base;
- a seat portion;
- a floor engaging fulcrum member disposed below the seat portion;
- a floor engaging foot rest portion positioned forwardly of the fulcrum member comprising an adjustable foot rest mechanism including:
  - an adjustable foot rest plate;
  - left and right guide bars spaced away from the seat structure substantially parallel thereto and disposed on opposite sides of the adjustable foot rest plate; and
  - left and right clamping means attached to the adjustable foot rest plate for clamping respective left and right guide bars such that the adjustable foot rest plate is movable to a selected position along the guide bars;
- a rearward floor engaging member on a side of the fulcrum member opposite from the foot rest portion;
- a handle member disposed rearwardly of the fulcrum member such that the chair is movable about the fulcrum member between a floor engaging patient entry/exit position wherein the floor engaging foot rest portion and the fulcrum member engage the floor and a patient rest position wherein the fulcrum member and the rearward floor engaging member engage the floor and a center of gravity of the chair shifts between a position forward of the fulcrum member and a position rearward of the fulcrum member when the chair is moved between the positions; and wherein:
- the seat portion, the floor engaging foot rest portion and the handle member form a seat structure which rests on and is attached to the base; and
- the fulcrum member and the rearward floor engaging member extend from the base to engage the floor.

20. The chair of claim 19 wherein both the left and right clamping means frictionally clamp respective left and right guide bars.

21. The chair of claim 20 and further including left and right wire loops extending outwardly from the sides of the seat structure in opposing directions, and left and right side barrier cushions having tab members insertable into the respective left and right wire loops for attachment of the cushions to the seat structure.

* * * * *

UNITED STATES PATENT AND TRADEMARK OFFICE
CERTIFICATE OF CORRECTION

PATENT NO. : 5,286,046

DATED : February 15, 1994

INVENTOR(S) : Donald L. Bottemiller; Arthur A. Apissomian

It is certified that error appears in the above-identified patent and that said Letters Patent is hereby corrected as shown below:

Col. 11, line 41, delete "mechanism", insert --stablizier mechanism--

Signed and Sealed this

Sixteenth Day of August, 1994

Attest:

BRUCE LEHMAN

*Attesting Officer*

*Commissioner of Patents and Trademarks*